(12) United States Patent
Kamenický et al.

(10) Patent No.: US 7,920,979 B2
(45) Date of Patent: Apr. 5, 2011

(54) SIGNAL GENERATION CIRCUIT

(75) Inventors: Petr Kamenický, Brno (CZ); Pavel Horsky, Brno (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 430 days.

(21) Appl. No.: 12/111,885

(22) Filed: Apr. 29, 2008

(65) Prior Publication Data

US 2009/0267673 A1 Oct. 29, 2009

(51) Int. Cl.
*G06F 1/04* (2006.01)
(52) U.S. Cl. ........................................ 702/66
(58) Field of Classification Search .................. 702/66
See application file for complete search history.

(56) References Cited

U.S. PATENT DOCUMENTS 6,963,616 B2 11/2005 Chan
2006/0022730 A1* 2/2006 Li ................................ 327/172

FOREIGN PATENT DOCUMENTS

EP 1416632 A1 5/2004

* cited by examiner

*Primary Examiner* — Tung S Lau
(74) *Attorney, Agent, or Firm* — Robert F. Hightower

(57) ABSTRACT

A signal generation circuit that uses a waveform generation mechanism to generate predetermined waveform(s) when triggered. A triggering mechanism is configured to repeatedly trigger the waveform generation mechanism at times that are dependent on data provided by a data source. The predetermined waveform may be a bandwidth-limited pulse, but might also be a rising edge or a falling edge of a pulse. Various consecutive waveforms may be summed together to thereby formulate a continuous signal. The waveform may have particular characteristics by design.

18 Claims, 6 Drawing Sheets

SIGNAL GENERATION CIRCUIT

BACKGROUND OF THE INVENTION

Electronic signals are used to communicate information between different nodes in a network. When generating a signal, it is often desirable that the signal has certain characteristics. For instance, suppose the signal is to be transmitted over a conductive medium. That conductive medium serves the desirable function of a conduit through which the signal may travel. Often, however, as the signal passes through the conductive medium, the conductive medium may take on the secondary and often undesirable function of an antenna. In other words, the signal may cause Electro-Magnetic Interference (EMI) to be emitted into the ambient environment.

The ambient environment may be sensitive to EMI emissions, depending on the frequency of the EMI emissions. For instance, EMI emissions at some frequencies may adversely affect surrounding circuitry. EMI emissions at some frequencies at excessive levels may be a violation of the law, since there are often strict controls over certain bands of airwave transmissions.

The EMI emitted into the ambient environment typically has some of the same frequency components as the signal that travels over the conductive medium. Accordingly, by controlling the frequency characteristics of the signal passing through a conductive medium, one can also control the frequency characteristics of the unintended EMI emissions emitted into the ambient environment.

One mechanism to control the frequency characteristics of the EMI emissions caused by a signal is to control the speed at which a signal transitions from one level to another. This is often termed "slope control". For instance, in a binary signal, as the signal transitions from high to low, and low to high, the speed at which the transition occurs is moderated. This has the effect of attenuating some of the higher frequency components of the EMI emissions.

BRIEF SUMMARY

Some embodiments described herein relate to a signal generation circuit that uses a waveform generation mechanism to generate predetermined waveform(s) when triggered. A triggering mechanism is configured to repeatedly trigger the waveform generation mechanism at times that are dependent on data provided by a data source. In one embodiment, the predetermined waveform is a bandwidth-limited pulse, but might also be a rising edge or a falling edge of a pulse. Various consecutive waveforms may be summed together to thereby formulate a continuous signal. The waveform may have particular characteristics by design, and will tend to have the same shape each time generated. Accordingly, by designing the waveform properly, the signal can be made to have a wide-variety of characteristics. In one embodiment, the waveform has a steep band-limited cutoff at a particular designed frequency. The signal (if digital) may be converted into an analog signal, and potentially passed through a low pass filter prior to being driven onto a network. In one embodiment, the network is an In-Vehicle Network.

Additional embodiments will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Some embodiments described herein relate to a signal generation circuit that uses a waveform generation mechanism to generate predetermined waveform(s) when triggered. A triggering mechanism is configured to repeatedly trigger the waveform generation mechanism at times that are dependent on data provided by a data source. In one embodiment, the predetermined waveform is a bandwidth-limited pulse, but might also be a bandwidth-limited rising step response and a bandwidth-limited falling step response, in which case there are multiple predetermined waveforms that could be generated. Various consecutive waveforms may be summed together to thereby formulate a continuous signal. The waveforms may each have particular characteristics by design, and will tend to have the same shape each time the corresponding waveform is generated. Accordingly, by designing the waveform properly, the signal can be made to have a wide-variety of characteristics. In one embodiment, the waveform has a steep band-limited cutoff at a particular designed frequency. The signal (if digital) may be converted into an analog signal, and potentially passed through a low pass filter prior to being driven onto a network. In one embodiment, the network is an In-Vehicle Network (IVN).

Figure 1:
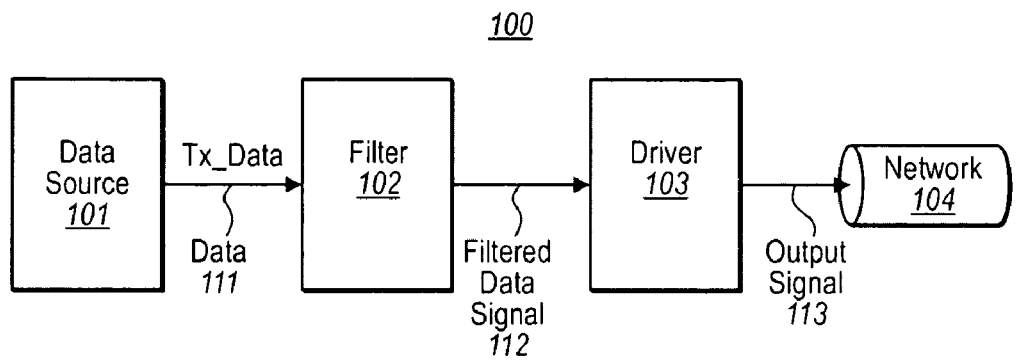
FIG. 1 illustrates a signal generation circuit that filters data prior to driving such data onto a network.

FIG. 1 illustrates a signal generation circuit 100 in accordance with one embodiment of the present invention. The signal generation circuit 100 includes a data source 101 that is configured to provide data 111, also represented as Tx_Data. The data 111 represent information that is to be transmitted over a network 104. The filtering mechanism 102 receives and filters the data 111 to thereby generate filtered data signal 112. The filtering mechanism 102 does not do slope control alone, although there may be an effect of controlling the slope. Instead, the filtering mechanism 102 actually filters the signal such that some frequency components of the filtered data signal 112 are attenuated as compared to the data signal 111.

Although the filter 102 may be an analog filter, the filter 102 may also be a digital filter such as, for example, an Infinite Impulse Response (IIR) filter, or a Finite Impulse Response (FIR) filter. In one embodiment, the filter 102 may have a waveform synthesizer, although that is not required. The filter 102 may perform steep-frequency filtering of the data signal.

Figure 2:
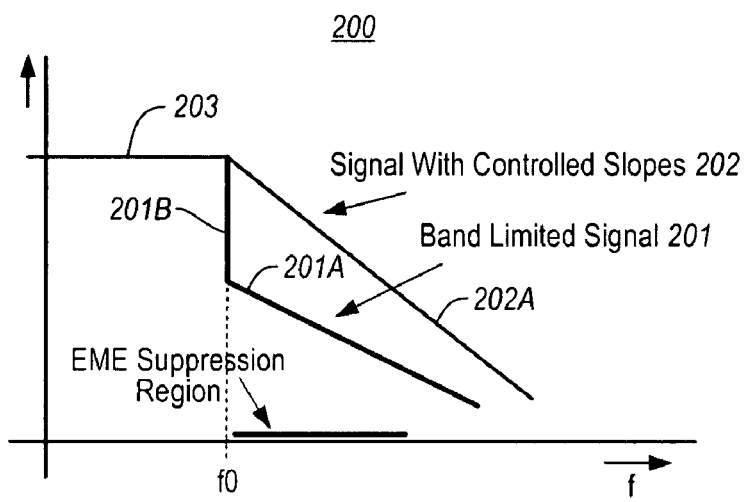
FIG. 2 illustrates an ideal frequency spectrum diagram showing an example steep-frequency wave frequency response using a band-limited signal as compared to the frequency response of a conventional signal with controlled slopes.

For instance, FIG. 2 illustrates an ideal frequency spectrum diagram 200 showing an example steep-frequency wave frequency characteristic (illustrated as "band-limited signal 201") as compared to the frequency response 202 of a conventional signal with controlled or shaped slopes. Below a certain cutoff frequency f0, the energy of the signal is about the same at level 203 for a steep-frequency signal 201, and a controlled slope response 202A. However, above the cutoff frequency f0, the energy level of the controlled slope decreases approximately linearly with increased frequency. The steep-frequency signal, on the other hand, has a sharp drop of energy levels at the cutoff frequency f0 (represented as 201B), and a steady decrease in energy levels thereafter as represented by slope 201A.

This sharp cutoff is helpful in situations in which it is desirable to have a strong signal below the cutoff frequency, but much lower energy levels at frequencies not much higher than the cutoff frequency. Once such situation is when the signal is being used to communicate in an In-Vehicle Network (IVN). In that situation, the cutoff frequency f0, might be, for example, 150 kiloHertz, or slightly below (perhaps 130 kiloHertz).

Referring back to FIG. 1, the filtered signal 112 is received by a driver 103, which prepares the filtered signal for being driven as the output signal 113 onto a network 104. The output signal 113 is driven in accordance with a certain protocol that is understood by one or more receivers. While the network 104 might be an In-Vehicle Network (IVN), the network 104 might be any type of network.

Figure 3:
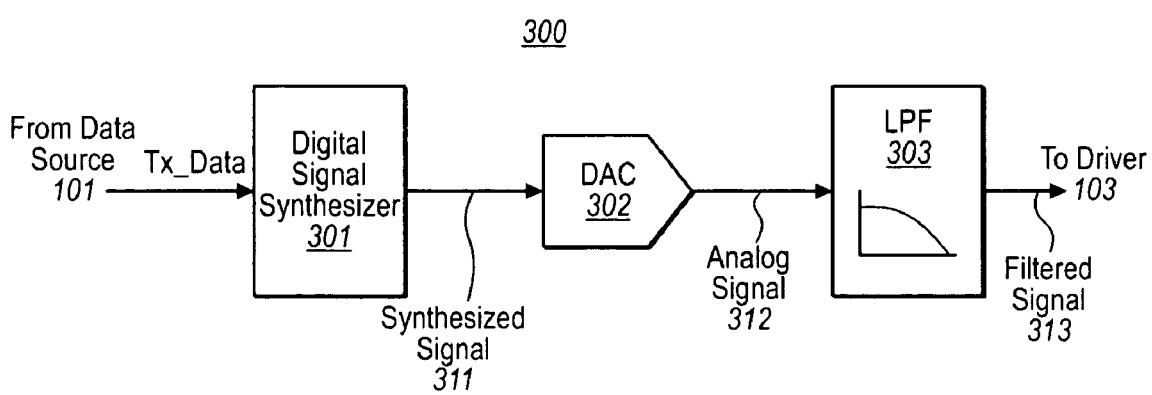
FIG. 3 schematically illustrates one embodiment of a filter of FIG. 1, the filter using a digital signal synthesizer.

FIG. 3 illustrates an embodiment 300 of the filtering mechanism 102 of FIG. 1. The filtering mechanism 300 includes a digital signal synthesizer 301 that receives the data signal Tx_Data form the data source 101 of FIG. 1. The digital signal synthesizer then generates a particular digitally synthesized signal 311 that includes a summation of several time-shifted versions of similar digital waveforms. In one embodiment, such waveforms are band-limited so as to have the frequency characteristics of the steep-frequency cutoff at frequency f0 in FIG. 2.

The synthesized digital signal 311 is provided to a digital-to-analog converter 302, where the digital signal 311 is converted into a corresponding analog signal 312. In the embodiment in which the output signal driven onto the network 104 is a steep-frequency signal, the analog signal 312 would ideally have the frequency response above frequency f0 that is represented by slope 201A in FIG. 2. In reality, however, there will still be some higher frequency components that might be quite strong due to, for example, quantization error in the amplitude of the digital signal, and in the discrete changes in the amplitude at the time resolution of the digital signal. In order to remove these higher frequency components that still might occur above the frequency f0, the analog signal 312 is passed through a low pass filter 303. The precise frequency that these higher frequency components appear may depend on the resolution amplitude of the digital signal, as well as the length of time from one discrete amplitude change to another in the digital signal. Accordingly, the cutoff frequency of the low pass filter 303 may be at the appropriate cutoff frequency that permits these higher frequency components to be attenuated. The low pass filter 303 then generates the filtered analog signal 313, which may be provided to the driver 103 of FIG. 1.

Figure 4:
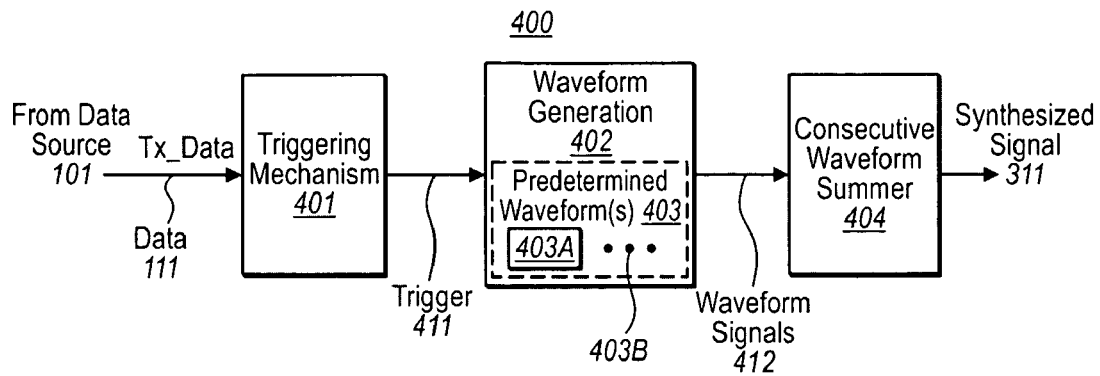
FIG. 4 schematically illustrates one embodiment of a digital signal synthesizer of FIG. 3 that uses a triggering mechanism to trigger a waveform generation mechanism to generate predetermined waveforms at certain times, which waveforms are then summed.

FIG. 4 illustrates an embodiment 400 of the digital signal synthesizer 301 of FIG. 3. The digital signal synthesizer 400 includes a waveform generation mechanism 402 configured to generate a predetermined digital waveform of one or more predetermined waveforms 403. Such predetermined waveforms 403 may include at least one predetermined waveform 403A and maybe possible others as represented by the ellipses 403B.

In one embodiment described hereinafter, there are two waveforms, a rising edge response waveform, and a falling edge response waveform. In that case, by triggering the rising edge waveforms and the falling edge waveforms alternately, a different width of a high pulse or low pulse may be generated. This might be suitable for a variable-width pulse protocol in which the width of any given pulse may be different for different amounts of time. In other words, the period of time of a high signal, and the period of time for a low signal may vary.

In another embodiment, there is but a single waveform, a fixed-width pulse (either a fixed-width high pulse or a fixed-width low pulse) that is generated by the waveform generation mechanism 402. This would be suitable for protocols that have only a certain fixed width in their pulses. In this description and in the claims, a "protocol" is any set of interpretation rules for interpreting signals to thereby extract information. According to this broad definition, even a clock signal may be a protocol since a clock signal certainly does convey information regarding timing that is interpreted by the receiver of the clock signal.

The waveform generation mechanism 402 can be an addressable memory. In one embodiment, the waveform generation mechanism is a look-up table that represents the predetermined waveform as a set of discrete values, each discrete value representing the value of the waveform at a particular relative time.

Figure 5:
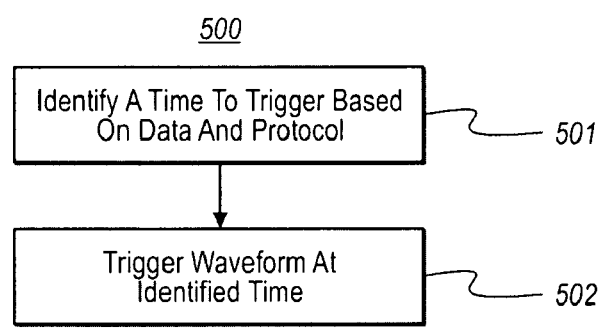
FIG. 5 illustrates a flowchart of a method for the triggering mechanism of FIG. 4 to trigger the waveform generation mechanism.

A triggering mechanism 401 repeatedly triggers the waveform generation mechanism 402 as represented by the trigger signal 411. FIG. 5 illustrates a flowchart of a method 500 for the triggering mechanism 401 to trigger the waveform generation mechanism 402. The method 500 includes identifying a time that the waveform generation mechanism is to be triggered based on the data signal Tx_Data provided by the data source (act 501). This timing depends on the data signal Tx_Data and on the protocol used to communicate. The triggering mechanism then triggers the waveform generation mechanism to digitally generate a predetermined waveform at the identified time (act 502).

If there are multiple predetermined waveforms that might be generated, the triggering mechanism might also identify which predetermined waveform is to be generated. Alternatively, the identity of the predetermined waveform may be implicit based on which predetermined waveform had been previously generated. For instance, if a rising edge predetermined waveform had been previously generated, the next predetermined waveform to be generated will be a falling edge predetermined waveform. On the other hand, if a falling edge predetermined waveform had been previously generated, the next predetermined waveform to be generated will be a rising edge predetermined waveform.

Returning to FIG. 4, a consecutive waveform summing mechanism 404 receives the waveform signals 412, and sums time-shifted versions of one or more of the most recently generated digital waveforms to thereby generate the synthesized signal 311. In one embodiment, each of the constituent digital waveforms 412 that constitute the synthesized signal has a finite duration.

Figure 6:
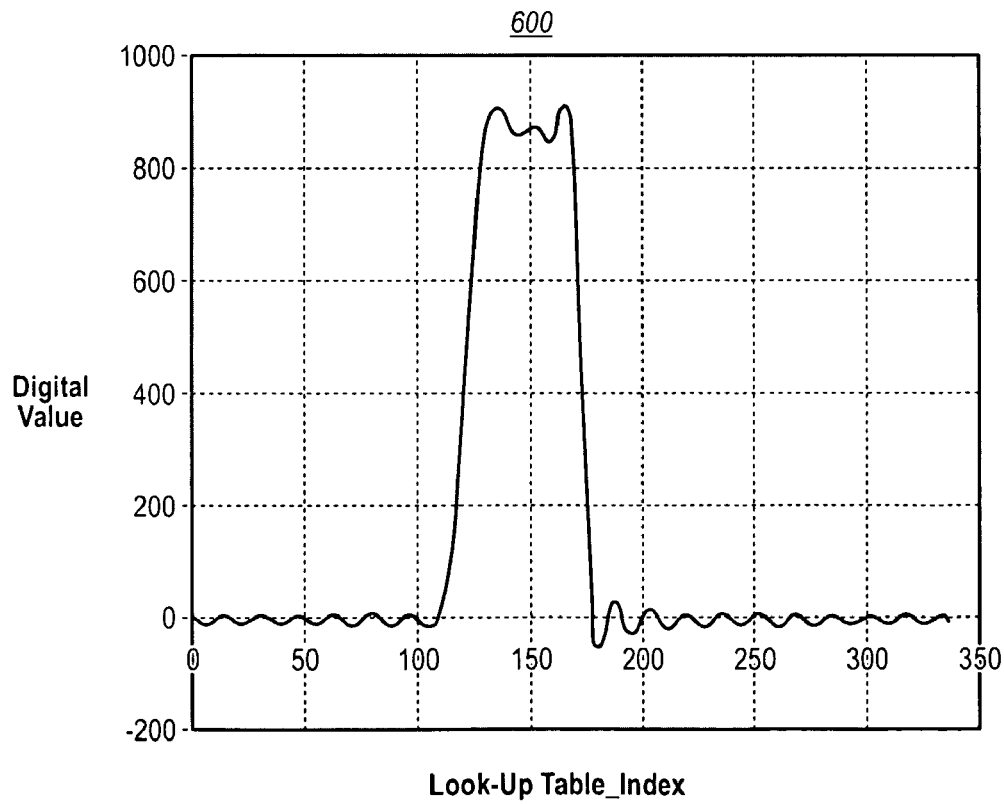
FIG. 6 illustrates an example of a predetermined waveform that might be generated by the waveform generation mechanism of FIG. 4.

As previously mentioned, the waveform generation mechanism 402 may generate a single predetermined digital waveform in the form of a digital pulse. FIG. 6 illustrates an example of such a predetermined digital waveform 600. The predetermined digital waveform 600 is represented perhaps in a look-up table. The horizontal axis plots the index of the look-up table begin at index 1 and extended until index 334. Accordingly, the relative time of the duration is represented by the index value, with index 1 representing the first coefficient of the waveform and index 334 representing the last coefficient of the waveform.

Note that the waveform begins well before the pulse. From index 1 until index 110 or so, there is merely some minor oscillation in the digital waveform. From index 111 to about index 140 or so is the rising edge of the pulse. From about index 140 to about index 165, the pulse has a high value which has some minor oscillation. From about index 165 to about index 180, the falling edge of the pulse is manifest. Note that from about index 180 to index 334 there is merely minor some oscillation of the waveform.

When steep frequency filtering is applied to an input pulse signal, there can be significant non zero signal oscillation for a significant period before and after the pulse. Therefore to generate a significantly band-limited waveform, a significant number of values are included before and after the actual pulse. Without such a buffer zone before and after the pulse, some higher frequency components might occur. In one embodiment, the length of the waveform before rising slope and after falling slope may be at least twice 1/f0, where f0 is the cutoff frequency above which the signal spectrum is to be attenuated. However, by increasing the length of the waveform before and after the rising and falling slopes, a sharper frequency cutoff may be obtained. Accordingly, in the example waveform of FIG. 6, the total length of the waveform is several times (perhaps 5 or more times or even more) 1/f0. Note that in FIG. 6, the oscillation is somewhat exaggerated so that the oscillation may be more visible.

A variable-width pulse may be obtained by having the waveform generator generate both a rising edge and a falling edge waveform, which may be summed together to get the full pulse. For instance, to obtain a positive pulse, a rising edge waveform is followed by a falling edge waveform. On the other hand, to obtain a negative pulse, a falling edge waveform is followed by a rising edge waveform. By altering the amount of time between the triggering of the two waveforms, the width of the pulse may be changed.

Figure 7:
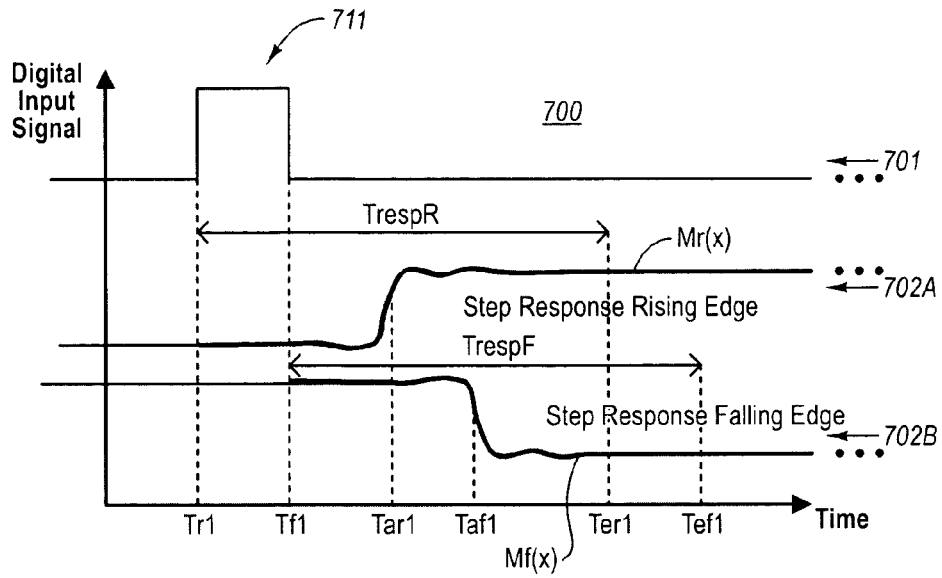
FIG. 7 illustrates a timeline signal diagram comparing an input pulse that is filtered into a summation of a predetermined rising edge waveform, and a predetermined falling edge waveform.

FIG. 7 illustrates a timing diagram 700 of several waveforms. The first waveform 701 includes a single pulse 711 that is to be transmitted. Of course, the pulse is illustrated as an ideal square wave which includes a number of high frequency components due to the sharp rising edge and falling edge. By generating predetermined band-limited waveforms instead of the square wave pulse, higher frequency components of the signal may be attenuated greatly.

The single pulse 711 has a rising edge at time Tr1 and a falling edge at time Tf1. The single pulse 711 is represented as a positive pulse. However, a negative pulse may be obtained by having the falling edge response for a particular pulse occur before the rising edge response for the same particular pulse. Returning to the positive pulse example, the rising edge at time Tr1 triggers the output of a predetermined rising edge waveform beginning at time Tr1 as presented by rising edge waveform 702A. Of course, since there is a buffer period in the rising edge waveform before the rising edge of the predetermined rising edge waveform actually occurs, it is some time after time Tr1 before the actual rising edge is experienced in signal 702A. In fact, the actual rising edge of the rising edge waveform 702A does not occur until time Tar1. The falling edge at time Tf1 triggers the output of a predetermined falling edge waveform beginning at time Tf1 as represented by the falling edge waveform 702B. Once again, due to the buffer period before the actual falling edge in the predetermined fall edge waveform, the actual falling edge does not occur until time Taf1.

The rising and falling edge waveforms continue for some time after the actual rising and falling edges. The finite duration of the predetermined rising edge waveform 702A ends at time Ter1, but may continue at a certain steady state high for purposes of summation. The finite duration of the predetermined falling edge waveform 702B ends at time Tef1, but continues at a certain steady state low value. The signals 702A and 702B are summed together to obtain the full band-limited pulse.

The rising edge signal is represented by Mr(x) having a response period TrespR, and the falling edge signal is represented by Mf(x) having a response period TrespF. Outside of the response period TrespR, the following Equations 1 and 2 may hold true for Mr(x):

$$\text{If } x<1, Mr(x)=0 \qquad (1)$$

$$\text{If } x>TrespR, Mr(x)=\text{Value} \qquad (2)$$

where "Value" is the value that the signal increased to when transitioning high.

Outside of the response period TrespF (which may, but need not, be the same length in duration as TrespR), the following Equations 3 and 4 may hold true for Mf(x):

$$\text{If } x<1, Mf(x)=0 \qquad (3)$$

$$\text{If } x>TrespF, Mf(x)=-\text{Value} \qquad (4)$$

Figure 8:
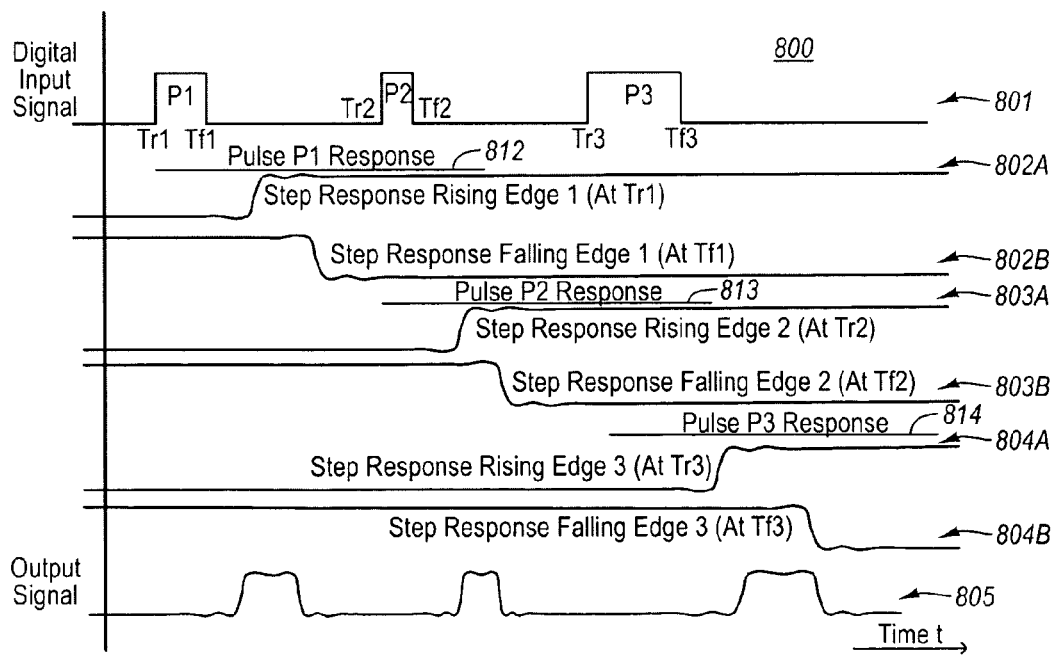
FIG. 8 illustrates a timeline signal diagram showing how multiple predetermined rising and falling edge waveforms may represent filtered versions of multiple pulses.

FIG. 8 illustrates a more comprehensive timing diagram 800 in which there is a digital input signal Tx_Data (illustrated as data input signal 801) that includes three pulses P1, P2, and P3, each having a different width. Pulse P1 has a rising edge at time Tr1 that causes the predetermined waveform 802A to be generated. Pulse P1 has a falling edge at time Tf1 that causes the predetermined waveform 802B. Collectively, the predetermined rising and falling edge waveforms define a pulse duration represented by 812. Pulse P2 has a rising edge at time Tr2 that causes the predetermined waveform 803A to be generated. Pulse P2 has a falling edge at time Tf2 that causes the predetermined waveform 803B. Collectively, the predetermined rising and falling edge waveforms 803A and 803B define a pulse duration represented by 813. Pulse P3 has a rising edge at time Tr3 that causes the predetermined waveform 804A to be generated. Pulse P3 has a falling edge at time Tf3 that causes the predetermined waveform 804B. Collectively, the predetermined rising and falling edge waveforms 804A and 804B define a pulse duration represented by 814.

Signal 805 represents the summed result of all of the constituent predetermined rising edge signals 802A, 803A and 804A predetermined falling edge signals 802B, 803B and 804B. The resulting signal represents a digital output signal that includes three band-limited pulses. To calculate the signal 805 in time, the responses of all pulses P are summed according to the following Equation 5:

$$Signal(t) = \sum_P [Mr(t - Tr_P) + Mf(t - Tf_p)] \quad (5)$$

where, Signal (t) is the summed digital signal as a function of time.

P varies from 1 to the total number of summed pulses.

$Tr_P$ is the time that the pth pulse experienced the rising edge; and $Tf_P$ is the time that the pth pulse experienced the falling edge.

In one embodiment, the number of pulses (i.e., the value of p) may be limited because the pulse response (where each pulse response is represented by the sum of the corresponding rising and falling edge waveforms) in time goes to 0 and thus can be neglected. The summing operation of Equation 5 may be performed by, for example, the consecutive waveform summer 404 of FIG. 4.

The predetermined rising edge and falling edge signals may be generated and summed to generate a signal having any width of pulses, whether variable from pulse to pulse, or whether fixed from pulse to pulse. However, if a protocol is being used in which the pulse width is always fixed (e.g., the signal is always high for a fixed period for a positive pulse, or the signal is always low for a fixed period for a negative pulse), the entire pulse response may be generated as the predetermined waveform by the waveform generation mechanism. As previously mentioned, examples of such protocols having a fixed positive pulse width include some clock signals, and Single Edge Nibble Transmission (SENT) protocol.

When used in a SENT protocol, for example, the EMI emissions may be kept low at 150 kiloHertz or above. Accordingly, the predetermined waveform may be design to have a steep frequency cutoff at somewhat less than 150 kiloHertz (perhaps 130 kiloHertz or so). Accordingly, EMI emissions at over 150 kiloHertz may be substantially attenuated.

Figure 9:
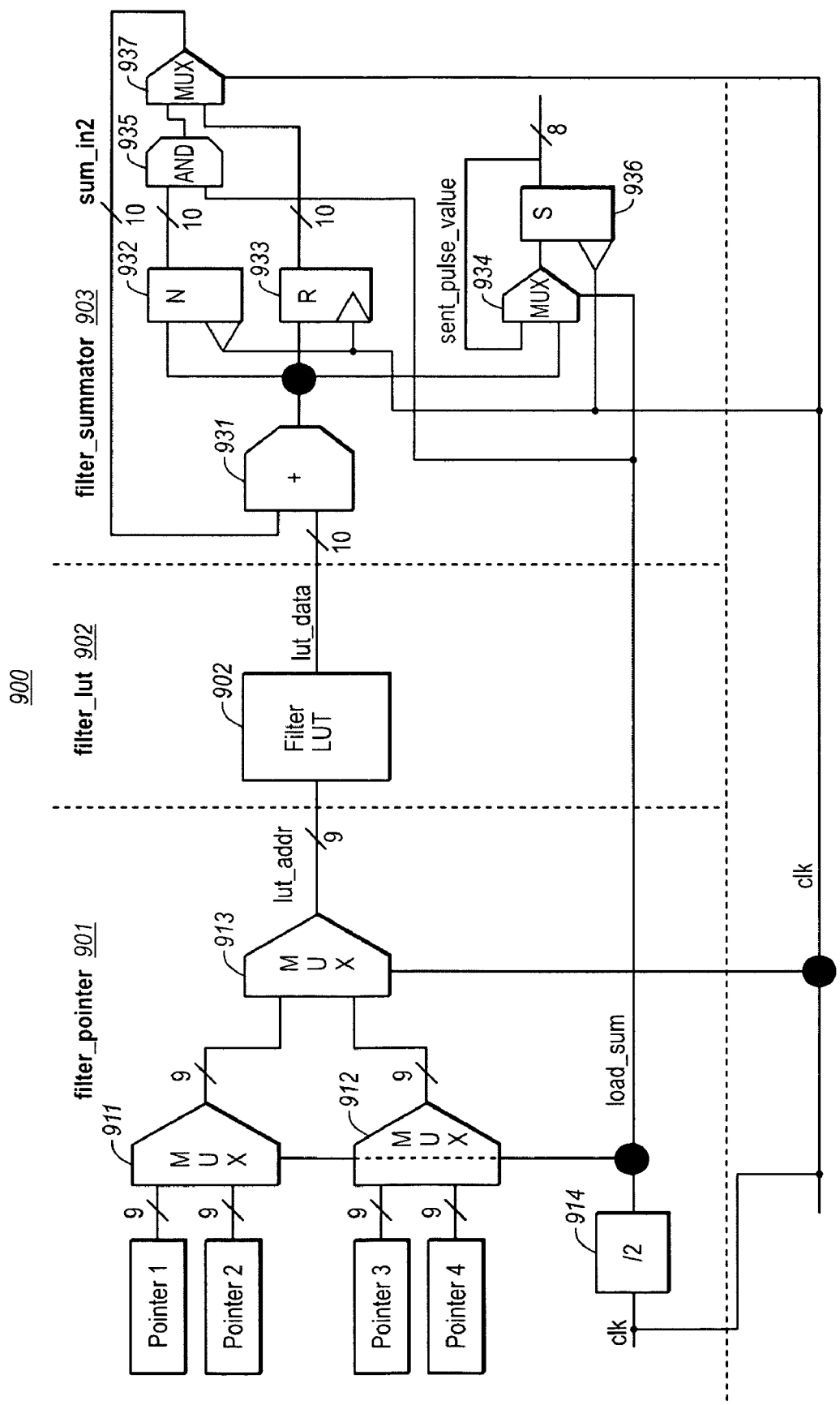
FIG. 9 illustrates an example block diagram of a digital waveform generation circuit that may serve as the digital waveform generation circuit of FIG. 4.

In one embodiment, when used with the SENT protocol, the number of summed pulses is perhaps limited to four. After four pulses, perhaps the original pulse can be neglected without influencing to a significant degree the spectrum of the summed output signal. If that is not true, the limit on the number of summed pulses may be increased. FIG. 9 illustrates one embodiment of a band-limited synthesizer 900 that may be used as the digital signal synthesizer 301 of FIG. 3 when used to drive a signal using the SENT protocol using a maximum of four summed pulses.

The specific implementation of FIG. 9 is just one specific example of how a band-limited synthesizer may be implemented. It is just one of an almost infinite variety of possible implementations that are consistent with the broader principles described herein. In this specific implementation, the width of each of the digital buses is marked. Addressing is accomplished using 9 bit busses. Recall that the waveform of FIG. 5 includes 334 index addresses, and thus can be addressed using 9 bits, which has 512 possible permutations. In one embodiment, the clock speed is 4 Megahertz, but the summation of the results is accomplished with double speed where one summation is done at the rising edge, and another at the falling edge of each pulse. The results of the summation may be made available at half speed (once every two clock cycles). This enables the real time summation of four waveforms using a single Look-Up Table.

The predetermined pulse waveform is stored in the filter look-up-table 902. Meanwhile, the circuit also includes a filter pointer portion 901 that provides an address to the filter look-up table. Pointers 1 through 4 correspond to a present position of the waveform within up to four time shifted versions of that waveform. Each of the pointers may have a 9 bit value in the case where the look-up table 902 has an index that is 334 addresses in size. The multiplexers 911 through 913 cause the input look up address lut_addr to cycle through each of the points 1 through 4 repeatedly at double clock speed.

The filter look-up table 902 thus outputs the corresponding value at the particular time for up to four different time-shifted versions of the same waveform. The filter_summator 903 servers to add up these up to four waveforms and output the result. FIG. 11 illustrates a signal timing diagram 1100 for several of the signals of FIG. 9, and will be used to describe the functioning of the circuit 900 of FIG. 9. The references to times T0 through T10 in FIG. 11 are not correlated with the times t1 through t9 in FIG. 10. The times T0 through T10 in FIG. 11 only apply to the discussion of FIG. 11, and not to FIG. 10, and vice versa.

The clock signal clk is also fed into a clock divider 914, which toggles the output signal load_sum with every falling edge of the input signal clk. The resulting load_sum signal represents a fifty percent duty cycle clock signal that operates at half the frequency of the signal clk, and whose transitions (i.e., at times T0, T2, T4, T6, T8 and T10) align with the falling edge of signal clk.

The multiplexers 911 through 913 are structured and controlled such that the four pointers are provided to the look-up table 902 at twice the clock speed. Thus, each pointer is provided to the look-up table 902 once every two clock cycles. In each iteration, pointer 1 is first provided, then pointer 3, then pointer 2, then pointer 4. Consequently, the data for pointers 1, 3, 2 and 4 are provided by the look-up table at twice the clock speed and in that order.

In FIG. 11, it can be seen that four values from the look-up table are summed every two clock cycles. Each of the summations are separated into four phases (also labeled in FIG. 11), each phase lasting half a clock cycle.

In phase 1, the load_sum signal is low and the clk signal is low. Accordingly, since the load_sum signal is low, the AND gate 935 will provide a value of "zero" to the multiplexer 937. Furthermore, since the clk signal is low, the multiplexer 937 allows the zero as value sum_in2 to the summer 931. In addition, the data for pointer one of waveform one (D11) is provided as the second input to the summer 931.

At the beginning of phase 2, the summed value from summer 931 (0+D11) are summed to generate the result D11, which is placed into the R register 933. Also in phase 2, the clk signal is high. Accordingly, the multiplexer 937 allows the value R11 from the R register 933 (which presently is D11) to be provided as the first input sum_in2 of the summer 931. In addition, the data for pointer three of waveform one (D13) is provided as the second input to the summer 931.

At the beginning of phase 3, the summed value from summer 931 (R11+D13) are summed to generate the results D11+D13, which is placed into the N register 932. Also in phase 3, the load_sum signal is high while the signal clk is low. Accordingly, the AND gate 935 and the multiplexer 937 allows the value D11+D13 from the N register 932 to be provided as the first input sum_in2 of the summer 931. In addition, the data for pointer two of waveform one (D12) is provided as the second input to the summer 931.

At the beginning of phase 4, the two inputs of the summer 931 are summed to generate the results D11+D13+D12, which are placed into the R register 933. Also in phase 4, the load sum signal is high, but the clk signal is also high. Accordingly, the multiplexer 937 allows the value D11+D13+D12 from the R register 932 to be provided as the first input of the summer 931. In addition, the data for pointer four of waveform one (D14) is provided as the second input to the summer 931.

At the beginning of phase 1 for the next summation cycle, the summer 931 sums the signals to generate the resultant value D11+D13+D12+D14 (which is placed into the N register 932, but is not used again). The same value is also allowed to pass through multiplexer 934, and S register 936 to result in the resulting summed signal sent_pulse_value being output from the circuit 900. This summed value is then updated once every two clock cycles.

Figure 10:
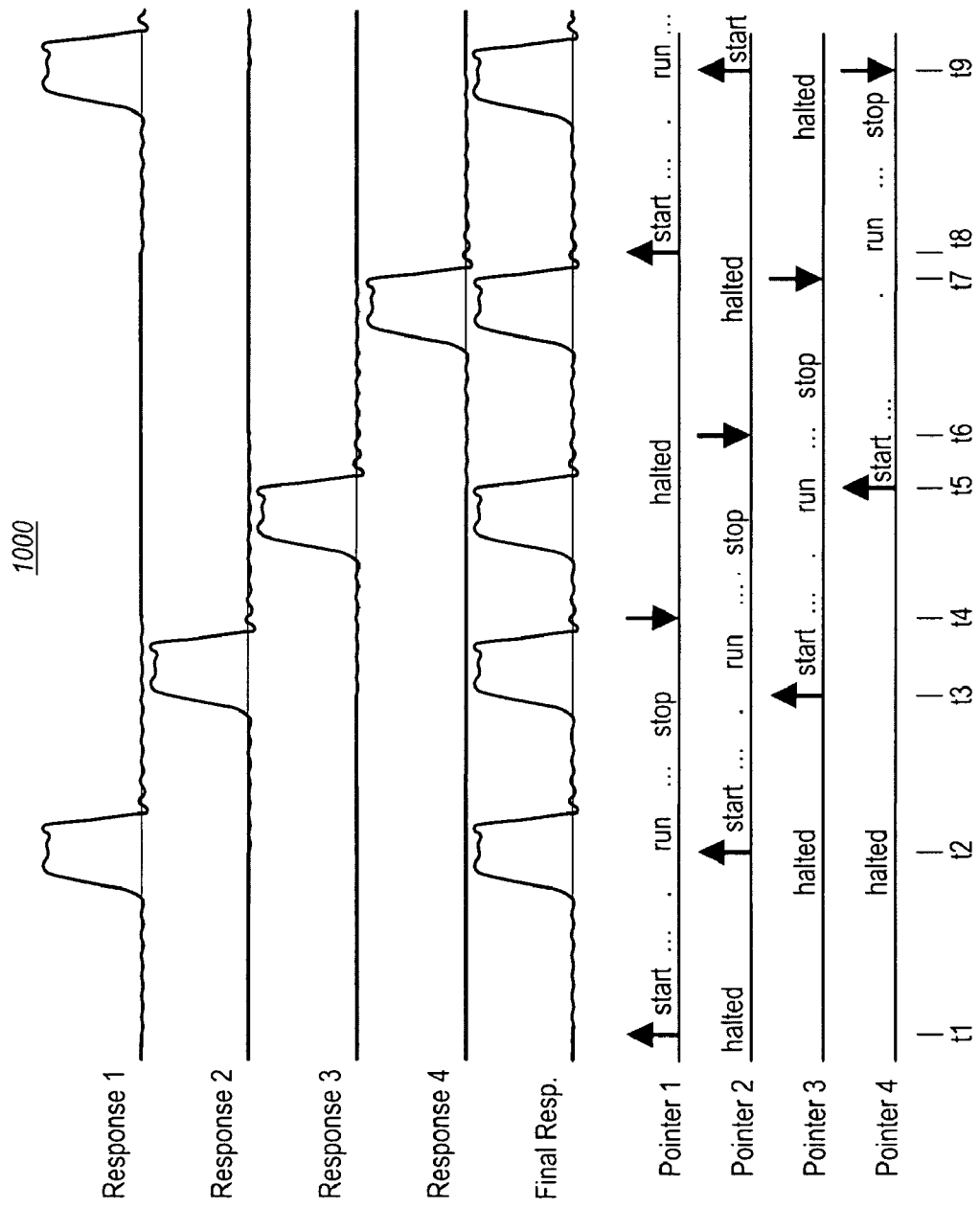
FIG. 10 illustrates an example timeline signal diagram showing the various states of the pointers of FIG. 9 used to generate the summed continuous signal.
Figure 11:
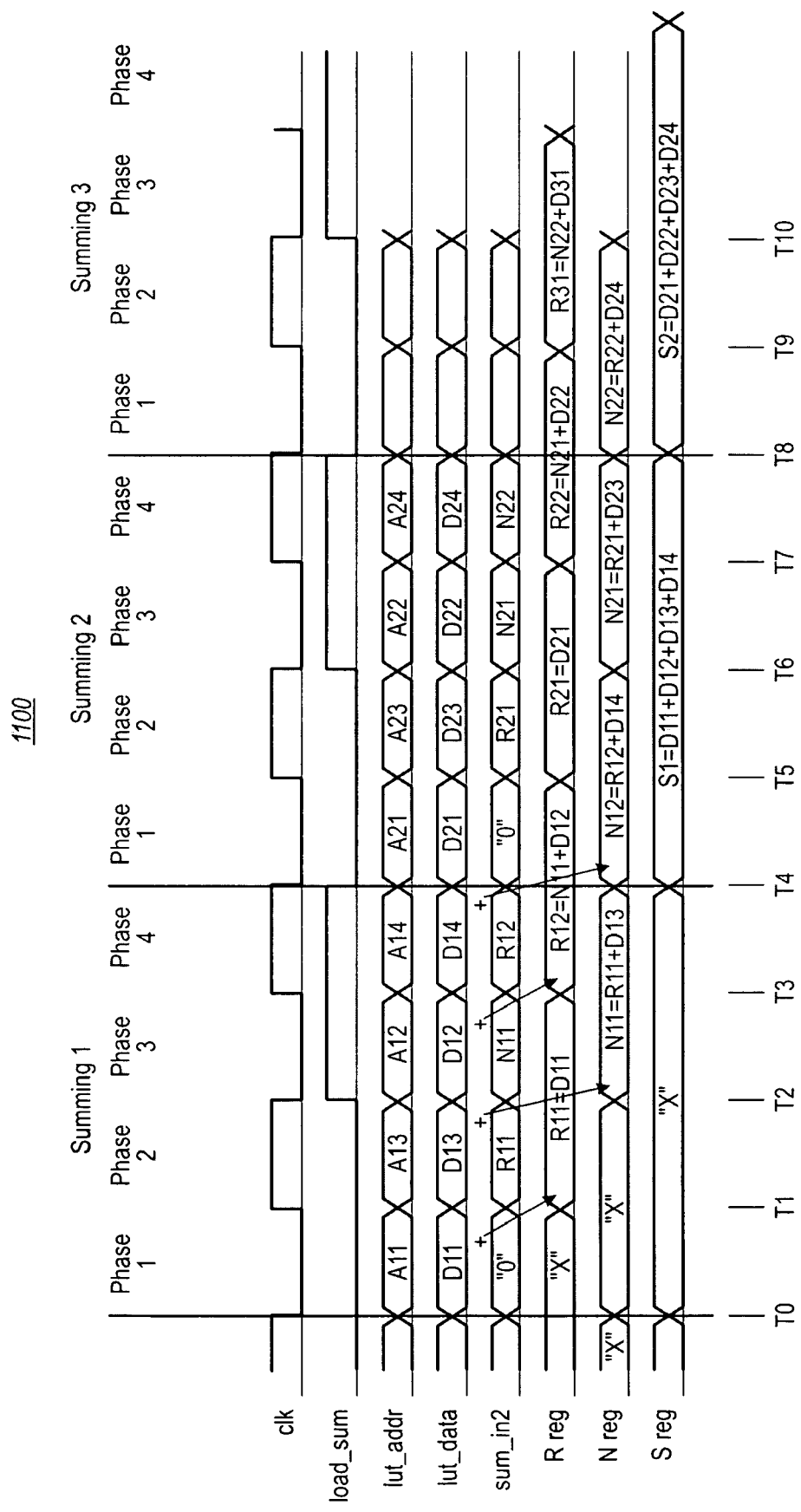
FIG. 11 illustrates a signal timing diagram for signals associated with the digital waveform generation circuit of FIG. 9.

Referring to FIG. 10, an example of how up to four waveforms may be summed using the circuit of FIG. 9 will now be described. At time t1 the first pointer 1 starts with a value of 1 and incrementally increases until at time t4, the pointer 1 hits a maximum value of 334, and the pointer 1 is halted. When a pointer is halted, it means that the value of that pointer results in a zero value being provided by the look-up table 902. In one embodiment, the oscillation before and after the waveform would cause some negative values of the signal waveform. Some offset may be added to the step response in order to avoid dealing with negative numbers in the lookup table and/or to avoid negative voltages being generated at the output of the system.

Referring back to FIG. 10, from time t1 to time t2, however, pointer 1 is the only pointer that is not halted, and thus there is only one waveform that is being summed to generate the output signal.

At time t2, however, pointer 2 is started indicating the start of a second instance of the predetermined waveform. From time t2 to time t3, there are thus two concurrent time-shifted instances of the same waveform (one corresponding to pointer 1, and one corresponding to pointer 2) that are being summed together in the filter_summator 903 to generate the output signal.

At time t3, pointer 3 is started indicating the start of yet another instance of the predetermined waveform. From time t3 to t4, there are thus three concurrent time-shifted instances of the same waveform (one corresponding to each of pointers 1 through 3) that are summed together to generate the output signal.

At time t4, the pointer 1 runs its course through the entire waveform and thus halts. Thus, from time t4 to time t5, there are only two concurrent time-shifted instances of the same waveform (corresponding to each of pointers 2 and 3) that are summed together to generate the output signal.

At time t5, pointer 4 is started indicating the start of yet another instance of the predetermined waveform. From time t5 to t6, there are thus three concurrent time-shifted instances of the same waveform (one corresponding to each of pointers 2 through 4) that are summed together to generate the output signal.

At time t6, the pointer 2 runs its course through the entire waveform and thus halts. Thus, from time t6 to time t7, there are only two concurrent time-shifted instances of the same waveform (corresponding to each of pointers 3 and 4) that are summed together to generate the output signal.

At time t7, the pointer 3 runs its course through the entire waveform and thus halts. Thus, from time t7 to time t8, there is only once instance of the waveform (corresponding to pointer 4) that represents the output signal.

At time t8, pointer 1 is once again started indicating the start of yet another instance of the predetermined waveform. From time t8 to t9, there are thus two concurrent time-shifted instances of the same waveform (one corresponding to each of pointers 4 and 1) that are summed together to generate the output signal.

At time t9, pointer 4 runs its course through its instance of the waveform and the same time that pointer 2 is once again started indicating the start of another instance of the predetermined waveform. Accordingly, immediately after time t9, there are thus two concurrent time-shifted instances of the same waveform (one corresponding to each of pointers 1 and 2) that are summed together to generate the output signal. The situation will continue until a pointer runs its course or another pointer begins again.

Referring to FIG. 9, by using a single look-up table 902 to generate all instances of the predetermined waveform, the size of the synthesizer circuit may be made quite small. In alternatively embodiments, a full look up table might be used for each possible concurrent instance of the predetermined waveform.

Accordingly, the embodiments described herein permit signal filtering to occur in any environment. In one embodiment, the signal filtering might occur using a digital signal synthesizer that synthesizes and sums time-shifted instances of predetermined waveforms. By proper design of such predetermined waveforms, a signal having certain characteristics can be generated. For instance, one might generate a band-limited signal that has a sharp cutoff at a certain frequency.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A signal generation circuit comprising:
   a data source configured to provide data that is to be represented by a signal to be generated by the signal generation circuit and conforming to a particular protocol;
   a waveform generation mechanism configured to generate a predetermined waveform of one or more predetermined waveforms when triggered wherein the predetermined waveform represents a band-limited pulse, wherein the full length of the predetermined waveform is at least twice the reciprocal of the cutoff frequency to be applied to the band-limited pulse;

a triggering mechanism configured to repeatedly trigger the waveform generation mechanism at a plurality of times by repeatedly performing the acts of identifying and triggering as follows:
an act of identifying a time that the waveform generation mechanism is to be triggered based on the data received from the data source; and
an act of triggering the waveform generation mechanism to generate a predetermined waveform at the identified time.

2. A signal generation circuit in accordance with claim 1, wherein the signal to be generated is a digital signal.

3. A signal generation circuit in accordance with claim 1, wherein the signal to be generated is an analog signal.

4. A signal generation circuit in accordance with claim 1, further comprising:
a consecutive waveform summing mechanism configured to sum a first generated predetermined waveform generated by the waveform generation mechanism with one or more time-shifted prior predetermined waveforms generated by the waveform generation mechanism.

5. A signal generation circuit in accordance with claim 1, wherein the waveform generation mechanism is configured to generate but a single predetermined waveform, such that the one or more predetermined waveforms are a single predetermined waveform.

6. A signal generation circuit in accordance with claim 1, wherein the waveform generation mechanism is configured to generate a predetermined rising edge waveform, and a predetermined falling edge waveform,
wherein if the triggering mechanism triggered the waveform generation mechanism to generate a rising edge waveform at a first iteration of the acts of identifying a time and triggering, the triggering mechanism triggers the waveform generation mechanism to generate a falling edge waveform at a next iteration of the acts of identifying a time and trigger; and
wherein if the triggering mechanism triggered the waveform generation mechanism to generate a falling edge waveform at the first iteration of the acts of identifying a time and triggering, the triggering mechanism triggers the waveform generation mechanism to generate a rising edge waveform at a next iteration of the acts of identifying a time and trigger.

7. A signal generation circuit in accordance with claim 1, wherein the one or more predetermined waveforms are band-limited to under a particular cutoff frequency.

8. A signal generation circuit in accordance with claim 1, wherein the signal generation circuit is incorporated within an In-Vehicle Network (IVN).

9. A signal generation circuit in accordance with claim 1, wherein the waveform generation mechanism comprises the following:
an addressable memory, wherein each of at least some of the addresses of the addressable memory include discrete values at a particular point in a predetermined waveform.

10. A signal generation circuit in accordance with claim 2, further comprising:
a digital to analog converter configured to convert the digital signal into an analog signal.

11. A signal generation circuit in accordance with claim 4, wherein each of the predetermined waveforms digitally generated by the waveform generation mechanism each has a finite duration, wherein the duration of the first generated predetermined waveform and the next prior generated predetermined waveform having finite durations that at least partially overlap in time.

12. A signal generation circuit in accordance with claim 5, wherein the particular protocol is a fixed-width pulse protocol.

13. A signal generation circuit in accordance with claim 6, wherein the particular protocol is a variable pulse width protocol.

14. A signal generation circuit in accordance with claim 7, wherein the particular cutoff frequency is 150 kiloHertz or less.

15. A signal generation circuit in accordance with claim 10, further comprising:
a low pass filter configured to filter the analog signal.

16. A signal generation circuit in accordance with claim 10, further comprising:
a driver configured to receive the analog signal, and prepare the analog signal for driving a network.

17. A signal generation circuit in accordance with claim 12, wherein the particular protocol is a clock signal.

18. A signal generation circuit comprising:
a data source configured to provide data that is to be represented by a signal to be generated by the signal generation circuit and conforming to a particular protocol;
a waveform generation mechanism configured to generate a predetermined waveform of one or more predetermined waveforms when triggered wherein the waveform generation mechanism is configured to generate but a single predetermined waveform, such that the one or more predetermined waveforms are a single predetermined waveform and wherein the single predetermined waveform represents a band-limited pulse, wherein the full length of the predetermined waveform is at least twice the reciprocal of the cutoff frequency to be applied to the band-limited pulse;
a triggering mechanism configured to repeatedly trigger the waveform generation mechanism at a plurality of times by repeatedly performing the acts of identifying and triggering as follows:
an act of identifying a time that the waveform generation mechanism is to be triggered based on the data received from the data source; and
an act of triggering the waveform generation mechanism to generate a predetermined waveform at the identified time.

* * * * *